United States Patent [19]
Taniguchi et al.

[11] Patent Number: 5,103,331
[45] Date of Patent: Apr. 7, 1992

[54] LIQUID CRYSTAL CELL HAVING SUBSTANTIALLY UNIFORM DISTRIBUTION OF SPACERS AND NON-UNIFORM DISTRIBUTION OF PARTICULATE ADHESIVE

[75] Inventors: Osamu Taniguchi, Chigasaki; Yukio Hanyu; Toshiharu Uchimi, both of Atsugi, all of Japan

[73] Assignee: Canon Kabushiki Kaisha, Tokyo, Japan

[21] Appl. No.: 386,627

[22] Filed: Jul. 31, 1989

[30] Foreign Application Priority Data

Aug. 4, 1988 [JP] Japan .................. 63-193451

[51] Int. Cl.⁵ .................................. G02F 1/13
[52] U.S. Cl. .......................... 359/81; 359/62
[58] Field of Search ................ 350/344, 339 R

[56] References Cited

U.S. PATENT DOCUMENTS

| | | | |
|---|---|---|---|
| 4,341,445 | 7/1982 | Matsuyama et al. | 350/344 |
| 4,732,961 | 3/1988 | Oka | 528/87 |
| 4,837,058 | 6/1989 | Aizawa et al. | 350/344 |

FOREIGN PATENT DOCUMENTS

| | | | |
|---|---|---|---|
| 60-153026 | 8/1985 | Japan | 350/344 |
| 62-174726 | 7/1987 | Japan | |

*Primary Examiner*—Andrew J. James
*Assistant Examiner*—Sara W. Crane
*Attorney, Agent, or Firm*—Fitzpatrick, Cella, Harper & Scinto

[57] ABSTRACT

A liquid crystal cell is formed by a pair of substrates each provided with an electrode and disposed spaced apart from each other, spacers and particulate adhesives respectively dispersed between the substrates and a liquid crystal, particularly a ferroelectric liquid crystal, sandwiched between the substrates. The particulate adhesives are dispersed with a non-uniform distribution over the cell extension so as to minimize initial zigzag or serrate alignment defects.

19 Claims, 2 Drawing Sheets

5,103,331

LIQUID CRYSTAL CELL HAVING SUBSTANTIALLY UNIFORM DISTRIBUTION OF SPACERS AND NON-UNIFORM DISTRIBUTION OF PARTICULATE ADHESIVE

FIELD OF THE INVENTION AND RELATED ART

The present invention relates to a structure for a liquid crystal cell, particularly a cell structure suitable for a ferroelectric liquid crystal.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal generally has chiral smectic C phase (SmC*) or chiral smectic H phase (SmH*), in which it is provided with a bistable orientation or alignment state where the liquid crystal molecules assume either of a first or a second optically stable state in response to an applied electric field. The ferroelectric liquid crystal shows a memory characteristic of retaining the resultant state in the absence of an electric field, and also shows a high-speed response to a change in electric field. Therefore, so that the ferroelectric liquid crystal is expected to be widely utilized in a high speed and memory type optical modulation device.

In a liquid crystal cell using a liquid crystal in a phase (such as chiral smectic phase) having a molecular layer structure, there has been pointed out that such a molecular layer structure is liable to be disordered by mechanical shock or cell distortion so that an alignment failure is caused. In order to solve the above-mentioned defect, it has been (for example) proposed to disperse particulate adhesives of e.g. an epoxy type in a space between a pair of substrates to bond the substrates so that the spacing between the substrate is not readily affected by external force (Japanese Laid-Open Patent Application No. 174726/1987 U.S. Pat. No. 4,732,961). We have confirmed that the occurrence of alignment failure due to the application of external stress can be suppressed by the use of such particulate adhesives.

According to further study, however, we have observed a problem that zigzag or serrate alignment defects increase noticeably in a liquid crystal cell immediately after it preparation where the above-mentioned particulation adhesives are utilized in large sized liquid crystal cells, particularly ferroelectric liquid crystal cells.

SUMMARY OF THE INVENTION

Accordingly, an object of the present invention is to provide a liquid crystal cell with improved durability by use of particulate adhesives and which also has minimal initial alignment defects.

A particular object of the present invention is to attain improved durability and minimal initial alignment defects in a ferroelectric liquid crystal cell.

The present invention in characterized by not uniformly dispersing the above-mentioned particulate adhesives in a liquid crystal cell but rather, by dispersing the particulate adhesives with a non-uniform distribution to minimize the alignment defects from occurring immediately after preparing the liquid crystal cell. More specifically, according to the present invention, there is provided a liquid crystal cell, comprising: a pair of substrates each provided with an electrode and disposed spaced apart from each other, spacers and particulate adhesives respectively dispersed between the substrates and a liquid crystal sandwiched between the substrates; wherein said particulate adhesives are dispersed with a non-uniform distribution over the cell extension.

According to a further study, it has been observed that the above-mentioned alignment defects found immediately after the preparation of the liquid crystal cell using particulate adhesives, generally occur at portions where the cell space is locally not filled with the liquid crystal. It is assumed that this is related to the volumetric contraction of a liquid crystal material, particularly a ferroelectric liquid crystal material, during the course of cooling from isotropic phase to the liquid crystal phase which is used in the cell.

Specifically, for preparation of a ferroelectric liquid crystal, there is generally adapted a process of filling a cell with a liquid crystal material heated into isotropic phase by raising the environmental temperature. After the cell is sealed, the liquid crystal material is cooled to a temperature (preferably room temperature) of smectic phase which is an operational liquid crystal phase. It has been found that the above-mentioned alignment defects occur as injection failure during the course of cooling from isotropic phase into smectic phase. During the course of cooling, it has been experimentally confirmed that several percent of volume contraction has occurred. On the other hand, when a cell using the above-mentioned particulate adhesives, is used, the cell spacing (and accordingly the cell volume) is kept substantially constant regardless of the temperature. Therefore, the volume contraction of the liquid crystal during the cooling stage is not compensated by a change in cell volume to cause microscopic voids.

On the other hand, in a liquid crystal cell using only spacer particles and not using particulate adhesives, there remains a flexibility in cell thickness change due to warping of a substrate, etc., so that the volume change of a liquid crystal can be compensated by a suitable local change in cell thickness. In this instance, the spacer particles have a function of restricting the decrease in cell thickness but are considered not to prohibit the volumetric contraction due to local change in cell thickness while regulating the overall thickness of the cell because of the following factors: (A) The spacer particles contact a substrate basically at points and exert less constraint than particulate adhesives which contact in areas, (B) spacers allow a warp a substrate in a direction of apart from the spacers so that there is left room for absorbing the volume contraction by a reverse direction of warp, and (C) some degree of fluctuation in particle size allows a local deformation of a substrate. As a result, it is considered that occurrence of voids as experienced in a cell using particulate adhesives is not caused.

In contrast, in the present invention, the effect of particulate adhesives of improving cell durability due to fixation of substrates to each other is basically maintained, while an ill effect thereof due to excessively uniform constraining effect is alleviated by non-uniformity of distribution to allow a local change in cell thickness so as to compensate the volumetric contraction of liquid crystal in the course of cooling. As a result, it has been succeeded to minimize poor alignment at the time of cell preparation, i.e., injection failure of a liquid crystal.

More specifically, by providing a non-uniform distribution of particulate adhesives according to the present invention, there are formed regions of a small distance and a long distance between adjacent particulate adhesives. In the region of a long distance between the adjacent particulate adhesive, the deformation of a substrate is readily caused so as to allow a change in thickness of compensating the volume change in liquid crystal. As a result, the injection failure due to volume contraction of liquid crystal can be prevented.

On the other hand, even if there is a distribution in dispersion of particulate adhesives, the particulate adhesive can exhibit a protective effect against a external impact if a sufficient number of particulate adhesives are used as a whole and unless a extremely local eternal force is applied.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
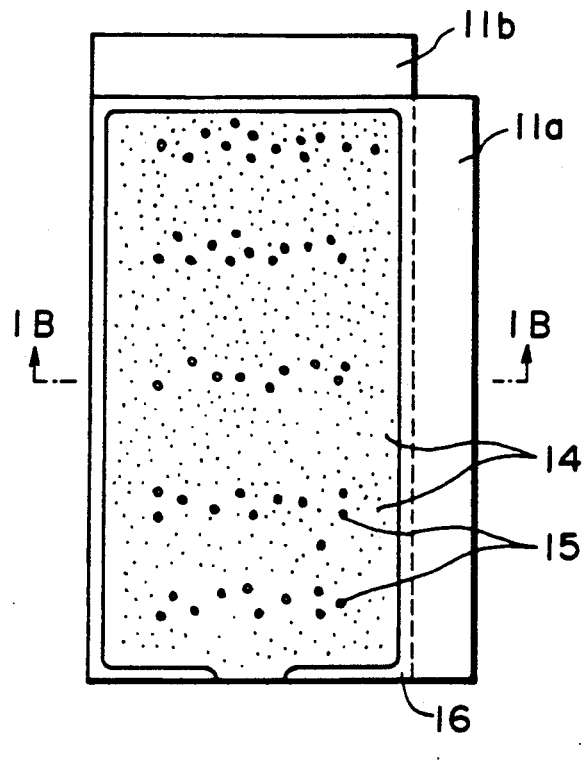
FIGS. 1A, 3, and 4 are respectively a schematic plan view of a liquid crystal device of the present invention.
Figure 1B:
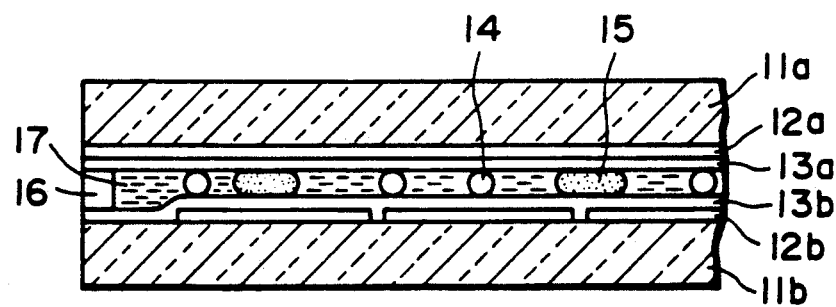
FIG. 1B is a partially enlarged schematic plan view taken along a line B—B in FIG. 1A.

FIG. 1A is a schematic plan view of an embodiment of the liquid crystal device of the present invention, and FIG. 1B is a partially enlarged sectional view of the device taken along the line B—B in FIG. 1A. Referring to FIG. 1B, the liquid crystal device comprises a pair of an upper substrate 11a and a lower substrate 11b disposed parallel to each other respectively coated with about 400-200° Å-thick transparent electrodes 12a and 12b. Between the upper substrate 11a and lower substrate 11b is disposed a ferroelectric liquid crystal, preferably a ferroelectric smectic liquid crystal 17 in a non-helical structure having at least two stable states.

The transparent electrode 12a and 12b are respectively coated with alignment control film 13a and 13b comprising, e.g., 10–1000 Å-thick film of a polymer, such as polyimide resin.

In the present invention, at least one of the alignment control films 13a and 13b may be provided with a uniaxial orientation axis. The uniaxial orientation axis may be preferably imparted by rubbing. It is further possible to dispose an insulating film of, e.g., 100–2000 Å-thick $SiO_2$ film, between the alignment control films 13a, 13b and transparent electrodes 12a, 12b.

The spacing between the substrates held by silica beads 14 having an average particle size of about 1.5 microns (generally 0.1–3.5 microns) dispersed in a liquid crystal layer 17. Further, in the liquid crystal layer 17 are disposed epoxy type particulate adhesives (trade name: "TORAYPEARL", available from Toray K.K.) for bonding both substrates. The particulate adhesives may have an average particle size of about 5 microns and assume the shape of compressed cylinders due to pressing both substrates in the liquid crystal layer 17 as shown in FIG. 1B. The periphery of the both substrates is sealed by an epoxy type adhesive 16. In the present invention, the particulate adhesives 15 are dispersed not uniformly but in a non-uniform distribution over the cell extension.

FIG. 1A is a schematic plan view for illustrating an example of dispersion. Wherein the particulate adhesives 15 are dispersed to have a dispersion density distribution in the form of stripes. In this instance the average dispersion density over the entire cell may be 10–100 pieces/$mm^2$. The distribution of dispersion density may be provided, for example, by disposing a hard mask having a pattern of desired distribution on a substrate and dispersing the particulate adhesives through the hard mask.

In order to attain the effect of minimizing initial alignment failure, the particulate adhesives may preferably dispersed with such a degree of non-uniform distribution as to provide a distribution factor of 2 or larger, particularly 4 or larger, wherein the distribution factor is defined as a ratio between the maximum density and the minimum density of particulate adhesives for region of 1 $mm^2$ arbitrarily taken over the cell extension (wherein the minimum dispersion density can be zero). It is further desired that the above-mentioned condition of the distribution factor being 2 or larger, particularly 4 or larger, is also satisfied with respect to a 10%-distribution factor which may be defined as a ratio between the distribution densities of a region of 10% from the maximum density and a region of 10% from the minimum density.

On the other hand, the spacer particles may preferably be uniformly dispersed over the entire cell at a dispersion density of, e.g., 50–1000 particles/$mm^2$ so as to prevent short circuit between electrode, to prevent image irregularity due to decrease in transmittance and to prevent non-uniform driving characteristics due to non-uniform electric fields for an applied voltage respectively caused by a local change in cell thickness. It is preferred to provide a 10%-distribution factor (further a simple distribution factor) of less than 2, particularly 1.5 or less. Even if the spacer particles are uniformly distributed in this way, the effect of the present invention is not essentially hindered for reasons (A)–(C) as described hereinbefore.

In order to provide mixed distribution states as described above including the non-uniform distribution state of the particulate adhesives and the uniform distribution state of the spacer particles, for example, the particulate adhesives non-uniformly distributed in the above-describe manner may be weakly heated to be temporarily bonded to a substrate, the spacer particles may be uniformly distributed, the other substrate is superposed thereon, and the particulate adhesives and sealing agent are heat-cured to form a cell. In the dispersion, it is possible to promote uniform distribution by charging dispersed particle and the substrate in reverse polarities. Further, it is also possible to form a non-uniform distribution on particulate adhesives on one substrate, uniformly disperse the spacer particles on the other substrate, and combine both substrates.

The ferroelectric liquid crystal used in the present invention may assume a chiral smectic phase, more specifically chiral smectic C phase (SmC*), H phase (SmH*), I phase (SmI*), K phase (SmK*) or G phase (SmG*) as an operating phase.

A particularly preferred class of ferroelectric liquid crystals may be those showing cholesteric phase as a higher temperature phase, an example of which is a phenyl ester type liquid crystal ("CS-1014" available from Chisso K.K.) showing the following phase transition series:

$$\text{Cryst.} \xrightarrow{-21°C} \text{SmC*} \underset{55°C}{\overset{57°C}{\rightleftarrows}} \text{SmA} \underset{67°C}{\overset{80°C}{\rightleftarrows}} \text{Ch.} \underset{81°C}{\overset{90°C}{\rightleftarrows}} \text{Iso.}$$

Figure 2:
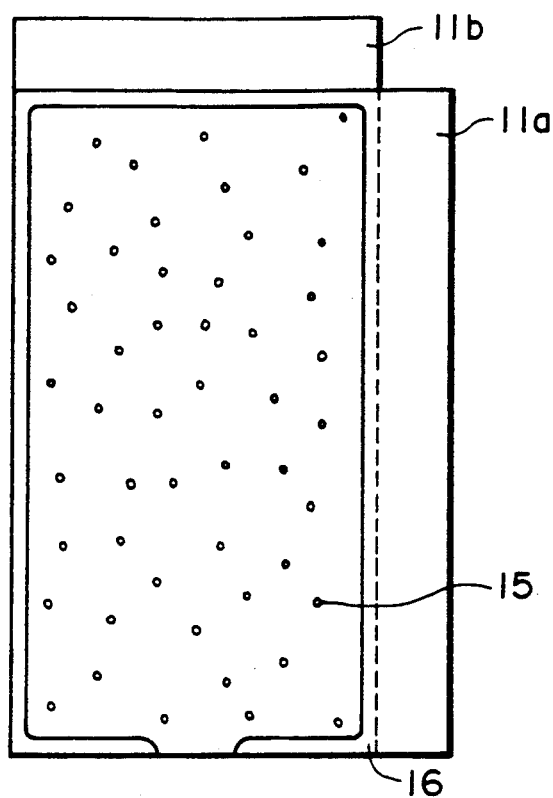
FIG. 2 is a schematic plan view of a comparative liquid crystal device.

In a specific embodiment, a liquid crystal cell having a structure as explained with reference to FIG. 1A and 1B was prepared in the following manner. A pair of substrate each having an effective area of 265 mm × 145 mm were provided. On one substrate, particulate adhesives having an average particle size of about 5 microns were dispersed to form about 10 mm-wide high density stripe regions (density: about 80/mm$^2$) and about 10 mm-wide adhesive-free stripe regions (density: 0/mm$^2$) alternately so as to provide an average dispersion density of about 40/mm$^2$. Further, silica beads having an average particle size of 1.5 microns were uniformly dispersed on the substrate at a density of about 300/mm$^2$. A blank cell prepared by using the substrates was filled with the above-mentioned phenyl ester type liquid crystal heated to 85° C. (cholesteric phase), and after sealing, gradually cooled to room temperature at a rate of 10° C./hour to form a liquid crystal cell. Five liquid crystal cell samples were prepared in this way, and the above-mentioned zigzag or serrate initial alignment defects were observed in only one of the five sample cells. By contrast, in five liquid crystal cell samples prepared in the same manner as above except that the particulate adhesives were uniformly dispersed at a density of 40/mm$^2$ as shown in FIG. 2 (the spacer particles are not shown), the above-mentioned zigzag or serrate alignment defects were observed in four cell samples.

Figure 3:
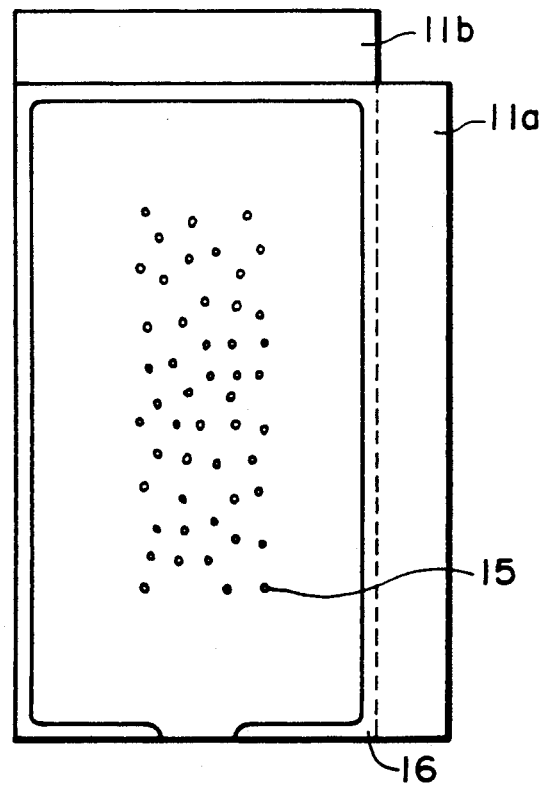
Figure 4:
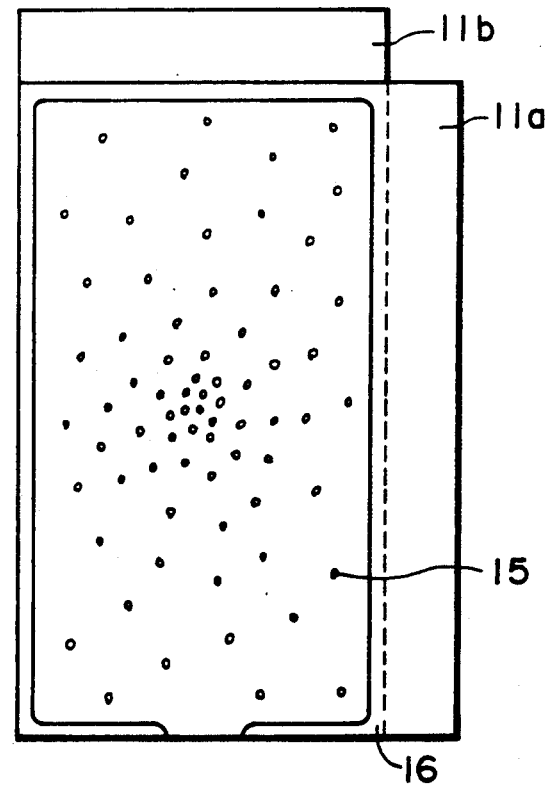

As has been already explained, even if a distribution density of particulate adhesive is present, a protective effect against an external shock can be exhibited if a sufficient number for particulate adhesives are used as a whole and unless an extremely local external force is applied. In this sense, the non-uniform distribution of the particulate adhesives may be achieved in various manner. In addition to the example shown in FIGS. 1A and 1B, for example, it is possible to provide a high density in the neighborhood of central region of a cell and a low density distribution region near the periphery as shown in FIG. 3. It is also possible to provide high density distribution region in the central part and radially decrease the density toward a periphery as shown in FIG. 4. However, in view of the essential function of ensuring the durability of a liquid crystal cell against an external stress such as a mechanical shock, it is not desirable to form a large adhesive-free region as to provide a large spacing of 100 mm or longer between adjacent particulate adhesives in a central region.

As has been explained, according to the present invention, adhesive particles which are used in a liquid crystal cell so as to provide a durability against an external stress are dispersed with a non-uniform distribution, whereby initial alignment defects due to poor injection of a liquid crystal are minimized even in preparation of a large area liquid crystal cell, particularly a ferroelectric liquid crystal cell.

What is claimed is:
1. A liquid crystal cell, comprising:
   a pair of substrates each of said substrates being provided with an electrode, said pair of substrates being disposed spaced apart from each other;
   said liquid crystal cell further comprising spacers and particulate adhesives dispersed between the substrates and a liquid crystal sandwiched between the substrates, wherein said particulate adhesives are dispersed with a non-uniform distribution over the cell extension and said spacers are dispersed to have a substantially uniform distribution over the cell extension.
2. A cell according to claim 1, wherein said particulate adhesives are dispersed to have a distribution factor of 2 or larger, said distribution factor being defined as a ratio between a maximum density and a minimum density of the particulate adhesives for regions of 1 mm square arbitrarily taken over the cell extension.
3. A cell according to claim 2, wherein said particulate adhesives are dispersed to have a distribution factor of 4 or larger.
4. A cell according to claim 1, wherein said particulate adhesives comprise an epoxy adhesive.
5. A cell according to claim 1, wherein said particulate adhesives are dispersed to have a distribution in the form of stripes.
6. A cell according to claim 1, wherein said spacers are dispersed to have a substantially uniform distribution of 50–1000/mm$^2$ over the cell extension.
7. A cell according to claim 1, wherein said spacers comprise silica beads.
8. A cell according to claim 1, wherein said liquid crystal comprises a ferroelectric liquid crystal.
9. A cell according to claim 8, wherein said ferroelectric liquid crystal is in a ferroelectric liquid crystal phase formed by cooling from a higher temperature phase.
10. A liquid crystal cell prepared according to a process comprising the steps of:
   (i) providing a pair of substrates each with an electrode and dispersing spacers at a substantially uniform distribution on at least one of the substrates over the extension thereof;
   (ii) dispersing particulate adhesives on at least one of the substrate with a non-uniform distribution over the extension of the substrate;
   (iii) disposing the substrates opposite to each other with the spacers and particulate adhesives sandwiched therebetween and sealing the substrates to each other with a space therebetween defined by the spacers to form a blank cell;
   (iv) filling the blank cell with a ferroelectric liquid crystal in a higher temperature phase than its ferroelectric liquid crystal phase; and
   (v) cooling the ferroelectric liquid crystal from the higher temperature phase to the ferroelectric liquid crystal phase.
11. A cell according to claim 10, wherein the step (V) comprises cooling the ferroelectric liquid crystal from cholesteric phase through smectic A phase into ferroelectric chiral smectic phase.
12. A cell according to claim 10, wherein the step (V) comprises cooling the ferroelectric liquid crystal from isotropic phase through cholesteric phase and smectic A phase into ferroelectric chiral smectic phase.
13. A cell according to claim 10, wherein the step (iv) comprises filling the blank cell with the ferroelectric liquid crystal in its cholesteric phase.

14. A cell according to claim 10, wherein said particulate adhesives are dispersed to have a distribution factor of 2 or larger, said distribution factor being defined as a ratio between a maximum density and a minimum density of the particulate adhesives for regions of 1 mm square arbitrarily taken over the substrate.

15. A cell according to claim 14, wherein said particulate adhesives are dispersed to have a distribution factor of 4 or larger.

16. A cell according to claim 10, wherein said particulate adhesives comprise an epoxy adhesive.

17. A cell according to claim 10, wherein said particulate adhesives are dispersed to have a distribution in the form of stripes.

18. A cell according to claim 10, wherein said spacers are dispersed to have a substantially uniform distribution of 50–1000/mm$^2$ over the substrate.

19. A cell according to claim 10, wherein said spacers comprise silica beads.

* * * * *

UNITED STATES PATENT AND TRADEMARK OFFICE
CERTIFICATE OF CORRECTION

PATENT NO. : 5,103,331

DATED : April 7, 1992

INVENTOR(S) : OSAMU TANIGUCHI, ET AL.

It is certified that error appears in the above-identified patent and that said Letters Patent is hereby corrected as shown below:

COLUMN 3

Line 17, "eternal" should read --external--.
    Line 29, "B-B" should read --1B-1B--.
    Line 38, "B-B" should read --1B-1B--.
    Line 47, "electrode" should read --electrodes--.
    Line 48, "film" should read --films--.
    Line 67, "pressing" should read --pressing of--.

COLUMN 4

Line 6, "dispersion. Wherein" should read --dispersion, wherein--.
    Line 34, "electrode," should read --electrodes,--.
    Line 56, "particle" should read --particles--.

COLUMN 5

Line 13, "substrate" should read --substrates--.

UNITED STATES PATENT AND TRADEMARK OFFICE
CERTIFICATE OF CORRECTION

PATENT NO. : 5,103,331

DATED : April 7, 1992

INVENTOR(S) : OSAMU TANIGUCHI, ET AL.

It is certified that error appears in the above-identified patent and that said Letters Patent is hereby corrected as shown below:

COLUMN 6

Line 45, "substrate" should read --substrates--.
Line 58, "step (V)" should read --step (v)--.
Line 62, "step (V)" should read --step (v)--.

Signed and Sealed this

Thirty-first Day of August, 1993

*Attest:*

BRUCE LEHMAN

*Attesting Officer*  *Commissioner of Patents and Trademarks*